US012466340B2

(12) United States Patent
Vellaiyandi et al.

(10) Patent No.: US 12,466,340 B2
(45) Date of Patent: Nov. 11, 2025

(54) NOISE EMISSION REDUCTION SYSTEM

(71) Applicant: VOLVO TRUCK CORPORATION, Gothenburg (SE)

(72) Inventors: Suresh Prabu Vellaiyandi, Bangalore (IN); Soorya R, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 200 days.

(21) Appl. No.: 18/512,523

(22) Filed: Nov. 17, 2023

(65) Prior Publication Data

US 2024/0190364 A1    Jun. 13, 2024

(30) Foreign Application Priority Data

Dec. 7, 2022 (EP) .................................... 22211996

(51) Int. Cl.
 *B60R 13/08* (2006.01)
 *G10K 11/178* (2006.01)
(52) U.S. Cl.
 CPC .... *B60R 13/0838* (2013.01); *G10K 11/17823* (2018.01); *G10K 11/17873* (2018.01); *G10K 2210/1282* (2013.01); *G10K 2210/1291* (2013.01); *G10K 2210/3027* (2013.01); *G10K 2210/3044* (2013.01); *G10K 2210/501* (2013.01)
(58) Field of Classification Search
 CPC .......... B60R 13/0838; G10K 11/17823; G10K 11/17873; G10K 2210/1282; G10K 2210/1291; G10K 2210/3027; G10K 2210/3044; G10K 2210/501
 See application file for complete search history.

(56) References Cited

U.S. PATENT DOCUMENTS 5,651,072 A    7/1997   Nakao et al.
5,692,053 A   11/1997   Fuller et al.
(Continued)

FOREIGN PATENT DOCUMENTS

CN    104978954 B  *  5/2021  ....... G10K 11/17873
DE       4114360 A1 * 11/1991  ............. F25D 29/00
(Continued)

OTHER PUBLICATIONS

Extended European Search Report in corresponding European Application No. 22211996.8 dated May 30, 2023 (10 pages).

*Primary Examiner* — David L Ton
(74) *Attorney, Agent, or Firm* — Venable LLP; Jeffri A. Kaminski

(57) ABSTRACT

A noise emission reduction system includes a solenoid couplable to a shielding member, and to a frame of a vehicle. The solenoid is controllable to induce vibration of the shielding member in relation to the frame of the vehicle. A microphone is configured to receive sound emitted by a noise source. An accelerometer is couplable to the frame and a controller is coupled to the solenoid, to the microphone, and to the accelerometer. The controller is configured to: receive a first signal from the accelerometer; receive a second signal from the microphone; determine a control signal for the solenoid based on the first signal and the second signal; and control the solenoid using the determined control signal to induce vibration of the shielding member in relation to the frame.

13 Claims, 3 Drawing Sheets

(56) References Cited

U.S. PATENT DOCUMENTS

| | | | |
|---|---|---|---|
| 10,741,162 B1* | 8/2020 | Bastyr | G10K 11/17879 |
| 2008/0144851 A1 | 6/2008 | Kim | |
| 2009/0301805 A1 | 12/2009 | Kakuhari | |
| 2011/0180480 A1 | 7/2011 | Kloeffel et al. | |
| 2013/0259252 A1 | 10/2013 | Yasuda et al. | |
| 2014/0286500 A1 | 9/2014 | Iwamoto et al. | |
| 2020/0194023 A1* | 6/2020 | Tintor | G10K 11/17873 |

FOREIGN PATENT DOCUMENTS

| | | | | | |
|---|---|---|---|---|---|
| GB | 2265277 A | * | 9/1993 | ....... | G10K 11/17817 |
| JP | H0798594 A | | 4/1995 | | |
| JP | 2018512336 A | * | 5/2018 | ....... | B29C 66/81433 |

* cited by examiner

NOISE EMISSION REDUCTION SYSTEM

TECHNICAL FIELD

The disclosure relates generally to mitigation of noise. In particular aspects, the disclosure relates to a noise reduction system. The disclosure can be applied in heavy-duty vehicles, such as trucks, buses, and construction equipment. Although the disclosure may be described with respect to a particular vehicle, the disclosure is not restricted to any particular vehicle.

BACKGROUND

Noise is generally undesirable, and various measures are taken to reduce noise. Such measures include arranging noise shielding material around a noise source to passively block or absorb noise, and to actively cancel noise using microphones to pick up a noise signal and speakers to emit an anti-phase signal. In the context of noise emitted by a noise source comprised in a vehicle, active noise cancelation is known to take place inside the cabin and may reduce the noise affecting the driver and/or passengers, but not the noise emitted to the environment. It would be desirable to provide for a reduction of the noise emitted from a noise source comprised in a vehicle to the environment.

SUMMARY

According to a first aspect of the disclosure, there is provided a noise emission reduction system comprising: a solenoid couplable to a shielding member configured to at least partly surround a noise source comprised in a vehicle, and to a frame of the vehicle, the solenoid being controllable to induce vibration of the shielding member in relation to the frame of the vehicle, when the solenoid is coupled to the shielding member and to the frame; a microphone configured to receive sound emitted by the noise source; an accelerometer couplable to the frame; and a controller coupled to the solenoid, to the microphone, and to the accelerometer, the controller being configured to: receive a first signal from the accelerometer; receive a second signal from the microphone; determine a control signal for the solenoid based on the first signal and the second signal; and control the solenoid using the determined control signal to induce vibration of the shielding member in relation to the frame, when the solenoid is coupled to the shielding member and to the frame. The first aspect of the disclosure may seek to provide for a reduction of the noise emitted from a noise source comprised in a vehicle to the environment. A technical benefit may include that efficient noise cancellation can be provided for a system that is itself in vibration, such as would be the case for a noise source in the form of an engine in a vehicle. By providing a solenoid for inducing vibration, it can be avoided that vibration of the vehicle itself results in signal saturation or other errors, as might be the case if a piezoelectric transducer were to be used instead. By providing an accelerometer couplable to the frame of the vehicle, a reference signal indicative of the "background vibration" of the system can be acquired, and the signal used for controlling the solenoid can be based on the reference signal. This provides for more accurate and efficient noise cancellation.

In some examples, the controller may be configured to determine the control signal in such a way that the control signal results in the solenoid inducing vibration of the shielding member substantially in anti-phase with the sound emitted by the noise source, when the solenoid is coupled to the shielding member and to the frame. A technical benefit may include to more efficiently reduce the emission of noise from the system (such as vehicle) including the noise source.

In some examples, the controller may comprise: difference signal providing circuitry coupled to the accelerometer to receive the first signal from the accelerometer and to the microphone to receive the second signal from the microphone, and configured to provide a difference signal indicative of a difference between second signal and the first signal; and a signal processor coupled to the difference signal providing circuitry, and configured to: determine the control signal based on difference signal; and provide the control signal to the solenoid. A technical benefit may include that the difference signal may be indicative of an acoustic spectrum of the noise in relation to the reference frame of the vehicle, so that an effective control signal can relatively easily be provided. This may provide for a more robust noise emission reduction system.

In some examples, the microphone may be arrangeable between the noise source and the shielding member. A technical benefit may include to enable acquisition of undisturbed noise, providing for an improved determination of the control signal.

In some examples, the solenoid may be a linear solenoid having a first end connectable to the shielding member, and a second end couplable to the frame, the solenoid being controllable to linearly move the first end in relation to the second end. A technical benefit may include to provide for improved induction of vibration of the shielding member in relation to the frame.

In some examples, the noise emission reduction system may comprise the shielding member. A technical benefit may include to facilitate installation of the noise emission reduction system in a vehicle.

In some examples, the solenoid may be coupled to the shielding member at a center of mass of the shielding member. A technical benefit may include to provide for improved control by the solenoid of the vibration of the shielding member.

In some examples, the shielding member may comprise a sound dampening material. A technical benefit may include to additionally provide for passive reduction of noise emission, resulting in improved overall noise emission reduction.

In some examples, the shielding member may be a sandwich construction comprising metal sheets and sound dampening material arranged between the metal sheets. A technical benefit may include to provide passive reduction of noise emission as well as to provide for sufficient rigidity to enable efficient induced vibration of the shielding member. The provision of a relatively large shielding member may be provided for, which may provide for a cost-efficient system.

In some examples, the noise emission reduction system may comprise a plurality of solenoids, each being couplable between a shielding member of a plurality of shielding members and the frame of the vehicle; and the controller may be coupled to each solenoid of the plurality of solenoids, and configured to control each solenoid using a control signal determined for that solenoid. A technical benefit may include to increase the efficiency of the noise emission reduction. For instance, shielding members can be vibrated in different directions, enabling more efficient noise emission reduction in these different directions.

In some examples, the noise emission reduction system may comprise a plurality of microphones arrangeable to receive sound emitted by the noise source in different directions; and the controller may be coupled to each microphone of the plurality of microphones, and configured to: receive, from each microphone of the plurality of microphones, a second signal indicative of the sound received by that microphone, resulting in a plurality of second signals; and determine the control signal for the solenoid based on at least one of the second signals in the plurality of second signals. A technical benefit may include to increase the efficiency of the noise emission reduction. For instance, noise can be picked up from different directions, enabling more efficient noise emission reduction in these different directions.

In some examples, the noise emission reduction system may comprise a sheet-shaped shielding member at least partly surrounding an internal combustion engine comprised in a heavy vehicle; a linear push pull solenoid having a first end connected to the sheet-shaped shielding member, and a second end coupled to a frame of the heavy vehicle, and being controllable to induce vibration of the sheet-shaped shielding member in relation to the frame of the heavy vehicle; a microphone arranged between the internal combustion engine and the sheet-shaped shielding member; an accelerometer coupled to the frame; and a controller coupled to the linear push pull solenoid, to the microphone, and to the accelerometer, the controller being configured to: receive a first signal from the accelerometer; receive a second signal from the microphone; determine a control signal for the solenoid based on the first signal and the second signal; and control the solenoid using the determined control signal to induce vibration of the sheet-shaped shielding member, wherein the induced vibration of the shielding member is substantially in anti-phase with the sound emitted by the internal combustion engine.

The noise emission reduction system according to the first aspect of the disclosure may be included in a vehicle, further comprising a frame, a noise source, and a shielding member. The noise source may, for example, comprise an internal combustion engine, and/or a transmission, and/or an engine after treatment system.

According to a second aspect of the disclosure, there is provided a method for reducing noise emission in a vehicle comprising a frame, a noise source, and a shielding member at least partly surrounding the noise source, the method comprising: receiving, by a controller from an accelerometer coupled to the frame, a first signal indicative of vibration of the frame; receiving, by the controller from a microphone arranged to receive sound emitted by the noise source, a second signal indicative of the sound emitted by the noise source; and controlling, by the controller, based on the first signal and the second signal, a solenoid coupled to the frame of the vehicle and to the shielding member to induce vibration of the shielding member in relation to the frame of the vehicle. The second aspect of the disclosure may seek to provide for a reduction of the noise emitted from a noise source comprised in a vehicle to the environment. A technical benefit may include that efficient noise cancellation can be provided for a system that is itself in vibration (together with the noise source), such as would be the case for a noise source in the form of an engine in a vehicle. By providing a solenoid for inducing vibration, it can be avoided that vibration of the vehicle itself results in signal saturation or other errors, as might be the case if a piezoelectric transducer were to be used instead. By providing an accelerometer couplable to the frame of the vehicle, a reference signal indicative of the "background vibration" of the system can be acquired, and the signal used for controlling the solenoid can be based on the reference signal. This provides for more accurate and efficient noise cancellation.

In some examples, the method may further comprise determining, by the controller, a control signal for the solenoid based on the first signal and the second signal; and the solenoid may be controlled using the control signal for the solenoid.

In some examples, the method may further comprise providing a difference signal indicative of a difference between second signal and the first signal; and determining the control signal based on difference signal.

In some examples, the solenoid may be controlled to induce vibration of the shielding member that is substantially in anti-phase with the sound emitted by the noise source.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

In view of various national regulations, as well as a desire to reduce noise pollution in general, it would be desirable to provide for a reduction of the noise emitted from a noise source comprised in a vehicle to the environment.

Figure 1:
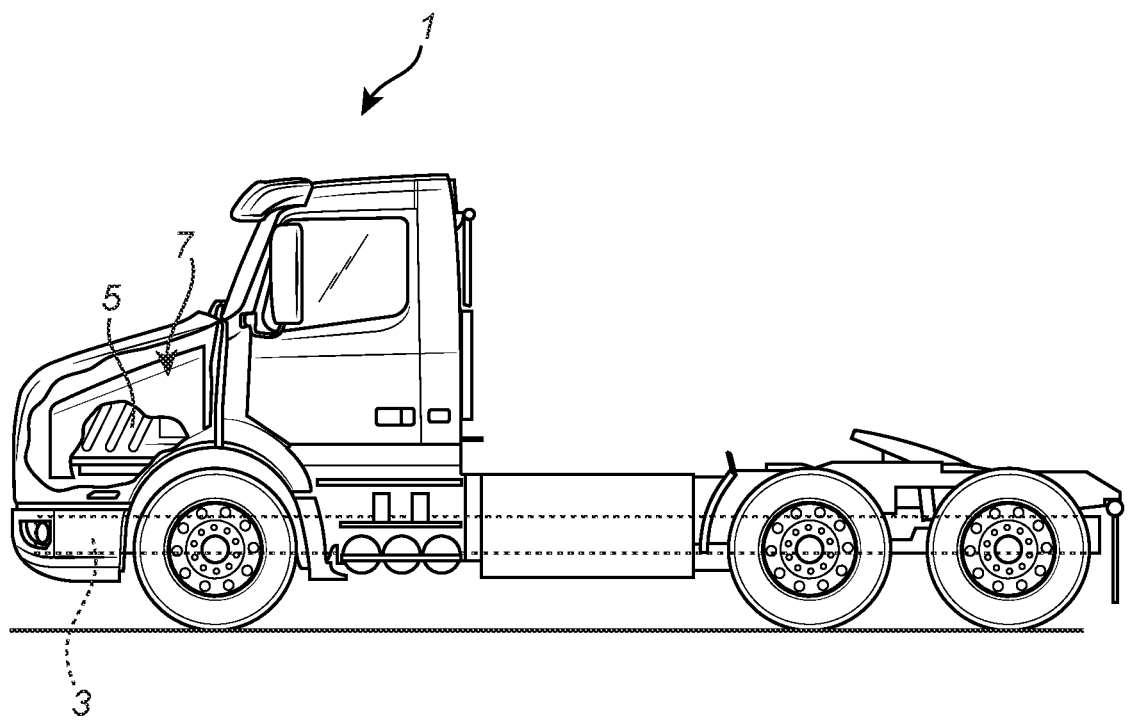
FIG. 1 is an exemplary vehicle according to one example.

FIG. 1 is an exemplary vehicle 1 according to one example. As is schematically shown in FIG. 1, the vehicle 1, here in the form of a truck, comprises a frame 3, a noise source 5, here exemplified by the internal combustion engine of the vehicle 1, and a noise emission reduction system 7.

Figure 2:
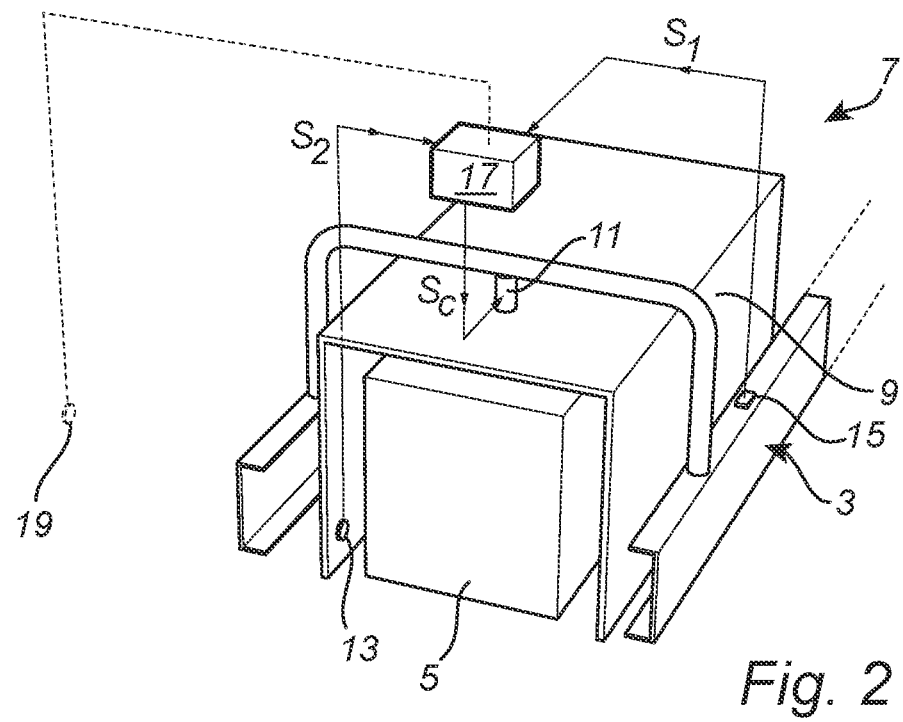
FIG. 2 is an exemplary noise emission reduction system according to one example.

FIG. 2 is an exemplary noise emission reduction system 7 according to one example. The noise emission reduction system 7 comprises a solenoid 11 a microphone 13, an accelerometer 15, and a controller 17. The solenoid 11 is couplable to a shielding member 9 configured to at least partly surround a noise source 5, and to a frame 3 being a reference structure for the noise emission reduction system 7. The solenoid 11 is controllable to induce vibration of the shielding member 9 in relation to the frame 3, when the solenoid 11 is coupled to the shielding member 9 and to the frame 3. The microphone 13 is configured to receive sound emitted by the noise source 5. The accelerometer 15 is couplable to the frame 3. The controller 17 is coupled to the solenoid 11, to the microphone 13, and to the accelerometer 15, and is configured to receive a first signal S1 from the accelerometer 15, receive a second signal S2 from the microphone 13, determine a control signal Sc for the solenoid 11 based on the first signal S1 and the second signal S2, and control the solenoid 11 using the determined control signal Sc to induce vibration of the shielding member 9 in relation to the frame 3, when the solenoid 11 is coupled to the shielding member 9 and to the frame 3. The microphone 13 may be configured to be arranged between the noise source 5 and the shielding member. As is schematically indicated in FIG. 2, the noise emission reduction system 7 may optionally include at least one external microphone 19 configured to be arranged outside the shielding member 9, in relation to the noise source 5. Optionally, the controller 17 may be configured to additionally receive a signal from the external microphone 19, and to determine the control signal Sc additionally based on the signal from the external microphone 19. The first signal S1 from the accelerometer 15 may be indicative of vibration of the frame 3, and the second signal S2 from the microphone 13 may be indicative of the noise emitted by the noise source 5. By controlling the solenoid 11 using the determined control signal Sc to induce vibration of the shielding member 9 in relation to the frame 3, a vibration component of the shielding member 9 induced by the noise emitted by the noise source 5 can be at least partly canceled out. By making the control signal Sc dependent on the first signal S1 from the accelerometer 15, efficient noise cancellation can be achieved even though the frame 3 is itself in vibration.

Figure 3:
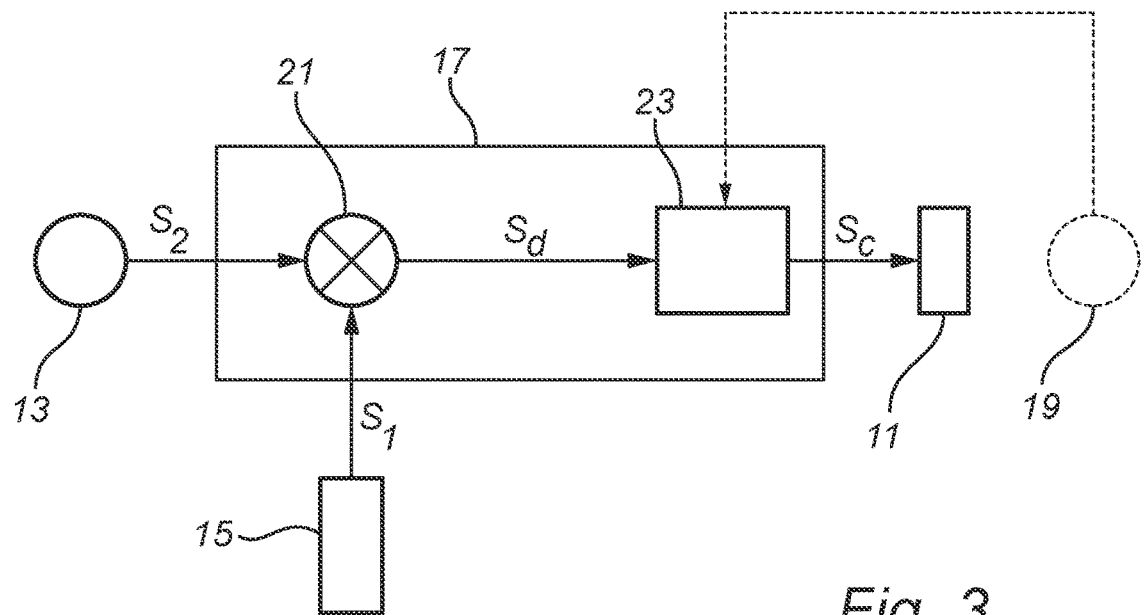
FIG. 3 is an exemplary noise emission reduction system according to one example.

FIG. 3 is an exemplary noise emission reduction system 7 according to one example. The controller 17 of the noise emission reduction system 7 according to this example comprises difference signal providing circuitry 21 and a signal processor 23. The difference signal providing circuitry 21 is coupled to the accelerometer 15 to receive the first signal S1 from the accelerometer 15 and to the microphone 13 to receive the second signal S2 from the microphone 13. The difference signal providing circuitry 21 is configured to provide a difference signal Sd indicative of a difference between the second signal S2 and the first signal S1. The signal processor 23 is coupled to the difference signal providing circuitry 21, and configured to determine the control signal Sc based on difference signal Sd; and provide the control signal Sc to the solenoid 11.

Figure 4:
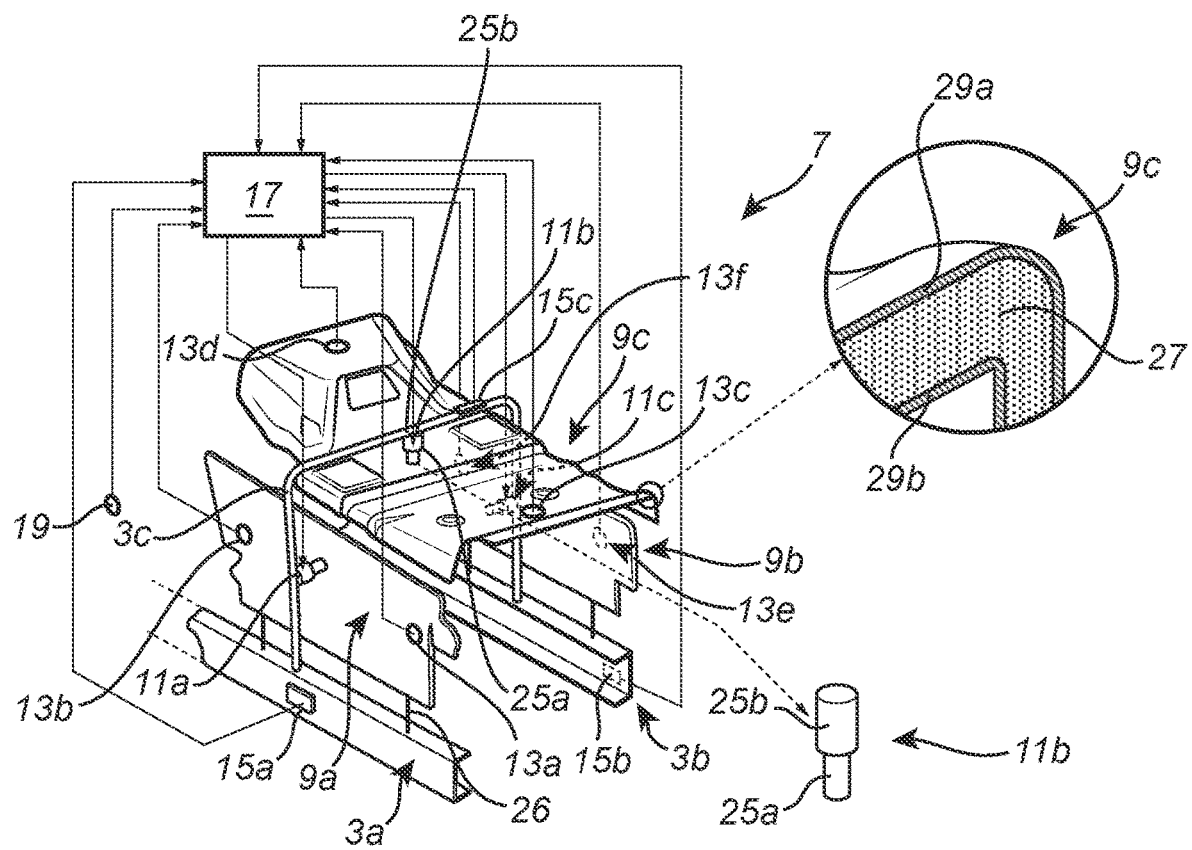
FIG. 4 is an exemplary noise emission reduction system according to one example.

FIG. 4 is an exemplary noise emission reduction system 7 according to one example. As is schematically indicated in FIG. 4, the noise emission reduction system 7 according to this example comprises a first sheet-shaped shielding member 9a, a second sheet-shaped shielding member 9b, and a third sheet-shaped shielding member 9c, first 11a, second 11b, and third 11c linear push pull solenoids, first 13a, second 13b, third 13c, fourth 13d, fifth 13e, and sixth 13f internal microphones, first 15a, second 15b, and third 15c accelerometers, a controller 17, and optionally at least one external microphone 19.

Each push pull solenoid 11a-c has a first end 25a (only indicated in FIG. 4 for one of the linear push pull solenoids 11a in order not to clutter the drawing) connected to its respective sheet-shaped shielding member 9a-c and a second end 25b coupled to the frame—here the upper part 3c of the frame, shown to be connected to right 3a and left 3b beams of the frame assembly. In the schematically illustrated example in FIG. 4, the first 9a and third 9c sheet-shaped shielding members—the side shielding members—are further coupled to the frame (the beams 3a-b of the frame assembly) by flexible members 26, such as springs or dampers. Although not explicitly shown in FIG. 4, it should be noted that the second sheet-shaped shielding member 9b—the upper shield member—may be coupled to the upper part 3c of the frame assembly and/or to the first 9a and third 9c sheet-shaped shielding members by similar flexible members.

To combine rigidity with passive sound absorbing properties, the sheet-shaped shielding members 9a-c (or selected ones of the shielding members 9a-c) may be a sandwich construction comprising metal sheets 29a-b and sound dampening material 27 arranged between the metal sheets 29a-b. The sound dampening material 27 may, for example, comprise steel wool. The sandwich construction may allow forming a relatively large sheet-shaped shielding member 9a-c, that is still capable of being vibrated uniformly by a solenoid or solenoids.

As is schematically shown in FIG. 4, the controller 17 is coupled to the solenoids 11a-c, to the internal microphones 13a-f, to the accelerometers 15a-c, and—optionally—to the external microphone 19. The controller 17 is configured to receive a respective first signal from each of the accelerometers 15a-c, to receive a respective second signal from each of the internal microphones 13a-f, to optionally receive a third signal from the external microphone 19, to determine a respective control signal for each of the solenoids 11a-c, based on the first signal, the second signal, and—optionally—the third signal, and to control the solenoids 11a-c using the determined control signal. The control signal may be determined to cause vibration of each of the sheet-shaped shielding members 9a-c, in relation to the frame 3, so that the resulting vibration of each of the sheet-shaped shielding members 9a-c is substantially in anti-phase with the sound emitted by the noise source (internal combustion engine, and/or transmission, and/or engine after treatment system).

Figure 5:
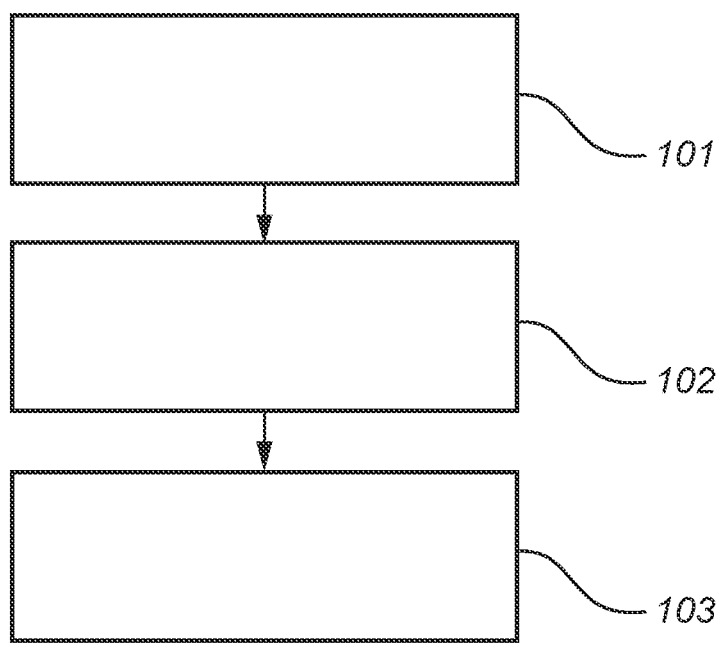
FIG. 5 is an exemplary method according to one example.

FIG. 5 is a flow-chart illustrating an exemplary method according to an example. Referring to FIG. 5, the method comprises receiving 101, by a controller 17 from an accelerometer 15 coupled to a frame 3 of a vehicle 1, a first signal S1 indicative of vibration of the frame, receiving 102, by the controller 17 from a microphone 13 arranged to receive sound emitted by a noise source 5, a second signal S2 indicative of the sound emitted by the noise source; and controlling 103, by the controller 17, based on the first signal S1 and the second signal S2, a solenoid 11 coupled to the frame 3 of the vehicle and to the shielding member 9 to induce vibration of the shielding member in relation to the frame of the vehicle.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A noise emission reduction system comprising:
   a shielding member configured to at least partly surround a noise source comprised in a vehicle, the shielding member being a sandwich construction comprising metal sheets and sound dampening material arranged between the metal sheets;
   a solenoid couplable to the shielding member, and to a frame of the vehicle, the solenoid being controllable to induce vibration of the shielding member in relation to the frame of the vehicle, when the solenoid is coupled to the shielding member and to the frame;
   a microphone configured to receive sound emitted by the noise source;
   an accelerometer couplable to the frame; and
   a controller coupled to the solenoid, to the microphone, and to the accelerometer, the controller being configured to:
   receive a first signal from the accelerometer;
   receive a second signal from the microphone;
   determine a control signal for the solenoid based on the first signal and the second signal; and
   control the solenoid using the determined control signal to induce vibration of the shielding member in relation to the frame, when the solenoid is coupled to the shielding member and to the frame,
   wherein the controller is configured to determine the control signal in such a way that the control signal results in the solenoid inducing vibration of the shielding member substantially in anti-phase with the sound emitted by the noise source, when the solenoid is coupled to the shielding member and to the frame.

2. The noise emission reduction system of claim 1, wherein the controller comprises:
   difference signal providing circuitry coupled to the accelerometer to receive the first signal from the accelerometer and to the microphone to receive the second signal from the microphone, and configured to provide a difference signal indicative of a difference between the second signal and the first signal; and
   a signal processor coupled to the difference signal providing circuitry, and configured to:
   determine the control signal based on difference signal; and
   provide the control signal to the solenoid.

3. The noise emission reduction system of claim 1, wherein the microphone is arrangeable between the noise source and the shielding member.

4. The noise emission reduction system claim 1, wherein the solenoid is a linear solenoid having a first end connectable to the shielding member, and a second end couplable to the frame, the solenoid being controllable to linearly move the first end in relation to the second end.

5. The noise emission reduction system of claim 1, wherein the solenoid is coupled to the shielding member at a center of mass of the shielding member.

6. The noise emission reduction system of claim 1, wherein:
   the noise emission reduction system comprises a plurality of solenoids, each being couplable between a shielding member of a plurality of shielding members and the frame of the vehicle; and
   the controller is coupled to each solenoid of the plurality of solenoids, and configured to control each solenoid using a control signal determined for that solenoid.

7. The noise emission reduction system of claim 1, wherein:
   the noise emission reduction system comprises a plurality of microphones arrangeable to receive sound emitted by the noise source in different directions; and
   the controller is coupled to each microphone of the plurality of microphones, and configured to:
   receive, from each microphone of the plurality of microphones, a second signal indicative of the sound received by that microphone, resulting in a plurality of second signals; and
   determine the control signal for the solenoid based on at least one of the second signals in the plurality of second signals.

8. The noise emission reduction system of claim 1, comprising:
   a sheet-shaped shielding member at least partly surrounding an internal combustion engine comprised in a heavy vehicle;
   a linear push pull solenoid having a first end connected to the sheet-shaped shielding member, and a second end coupled to a frame of the heavy vehicle, and being controllable to induce vibration of the sheet-shaped shielding member in relation to the frame of the heavy vehicle;
   a microphone arranged between the internal combustion engine and the sheet-shaped shielding member;
   an accelerometer coupled to the frame; and
   a controller coupled to the linear push pull solenoid, to the microphone, and to the accelerometer, the controller being configured to:
   receive a first signal from the accelerometer;
   receive a second signal from the microphone;

determine a control signal for the solenoid based on the first signal and the second signal; and control the solenoid using the determined control signal to induce vibration of the sheet-shaped shielding member, wherein the induced vibration of the shielding member is substantially in anti-phase with the sound emitted by the internal combustion engine.

9. A vehicle comprising:
a frame;
a noise source;
a shielding member; and
the noise emission reduction system of claim 1.

10. The vehicle of claim 9, wherein the noise source comprises an internal combustion engine.

11. A method for reducing noise emission in a vehicle comprising a frame, a noise source, and a shielding member at least partly surrounding the noise source, the shielding member being a sandwich construction comprising metal sheets and sound dampening material arranged between the metal sheets, the method comprising:

receiving, by a controller from an accelerometer coupled to the frame, a first signal indicative of vibration of the frame;

receiving, by the controller from a microphone arranged to receive sound emitted by the noise source, a second signal indicative of the sound emitted by the noise source; and controlling, by the controller, based on the first signal and the second signal, a solenoid coupled to the frame of the vehicle and to the shielding member to induce vibration of the shielding member in relation to the frame of the vehicle, the vibration being substantially in anti-phase with the sound emitted by the noise source.

12. The method of claim 11, wherein:
the method further comprises determining, by the controller, a control signal for the solenoid based on the first signal and the second signal; and
the solenoid is controlled using the control signal for the solenoid.

13. The method of claim 12, comprising:
providing a difference signal indicative of a difference between second signal and the first signal; and
determining the control signal based on difference signal.

* * * * *